Oct. 13, 1953     J. B. PETERSON     2,655,040
WATER SPEED INTEGRATOR AND INDICATOR
Filed May 14, 1946     2 Sheets-Sheet 1

INVENTOR.
JOHN B. PETERSON
BY
*Strauch & Hoffman*
ATTORNEYS

Oct. 13, 1953  J. B. PETERSON  2,655,040
WATER SPEED INTEGRATOR AND INDICATOR
Filed May 14, 1946  2 Sheets-Sheet 2

INVENTOR.
JOHN B. PETERSON
BY
Strauch & Hoffman
ATTORNEYS

UNITED STATES PATENT OFFICE 2,655,040

WATER SPEED INTEGRATOR AND INDICATOR

John B. Peterson, Bethesda, Md.; Ruth L. Peterson, administratrix of said John B. Peterson, deceased, assignor to Bendix Aviation Corporation, a corporation of Delaware Application May 14, 1946, Serial No. 669,546

2 Claims. (Cl. 73—183)

This invention relates to speed instruments, in particular to instruments for indicating and integrating the speed of a vessel through the water.

Water speed indicators or ship's logs of various types, including those using water driven impellors and those using Pitot-static differential devices, are well known. Such instruments as have been made in the past have not been entirely satisfactory, and my instrument incorporates novel features which provide more reliable and satisfactory performance in instruments of the Pitot-static type.

It is, accordingly, the primary object of my invention to provide a novel and improved water speed indicator and/or integrator.

It is another object of my invention to provide novel and improved means for utilizing the Pitot-static differential pressure to indicate the water speed and to integrate the speed to obtain the distance traveled.

Another important object is the provision of a novel water speed indicator wherein the differential Pitot-static pressure is employed to control an element of an electrical indicator, the element being sealed against the water in the Pitot-static system which also has means to eliminate air.

Other objects will become apparent as the description proceeds in connection with the drawings, wherein.

In Pitot-static type water speed instruments the relation of the speed to the Pitot pressure is expressed by the following equation:

$$v = c\sqrt{2gh} \qquad (1)$$

where:

$v$=velocity in feet/second.
$g$=the acceleration of gravity in feet/second$^2$.
$h$=the head of liquid due to Pitot pressure, in feet.
$c$=a constant, approximately unity.

The manometer liquid constituting the head $h$ is assumed to have the same density as that of the water through which the ship is moving.

The following practical equation is derived from Equation 1 making the following assumptions:

1. The constant, $c=1$.
2. The density of sea water=1.025.
3. The density of mercury=13.6 at 0° C.
4. The acceleration of gravity=32.17.

then:

$$V = 4.99\sqrt{P_T - P} \qquad (2)$$

where:

$V$=Speed in knots.
$P_T$=Pitot pressure, inches of mercury.
$P$=Static pressure, inches of mercury.

The variation in density of sea water due to normal variations in temperature and salinity does not exceed the range 1.023 to 1.027. This variation of 0.2% in density will cause a variation of only 0.1% in speed indication. This figure is so small that it is not considered necessary to provide compensation for the variation in density.

Figures 1, 2:
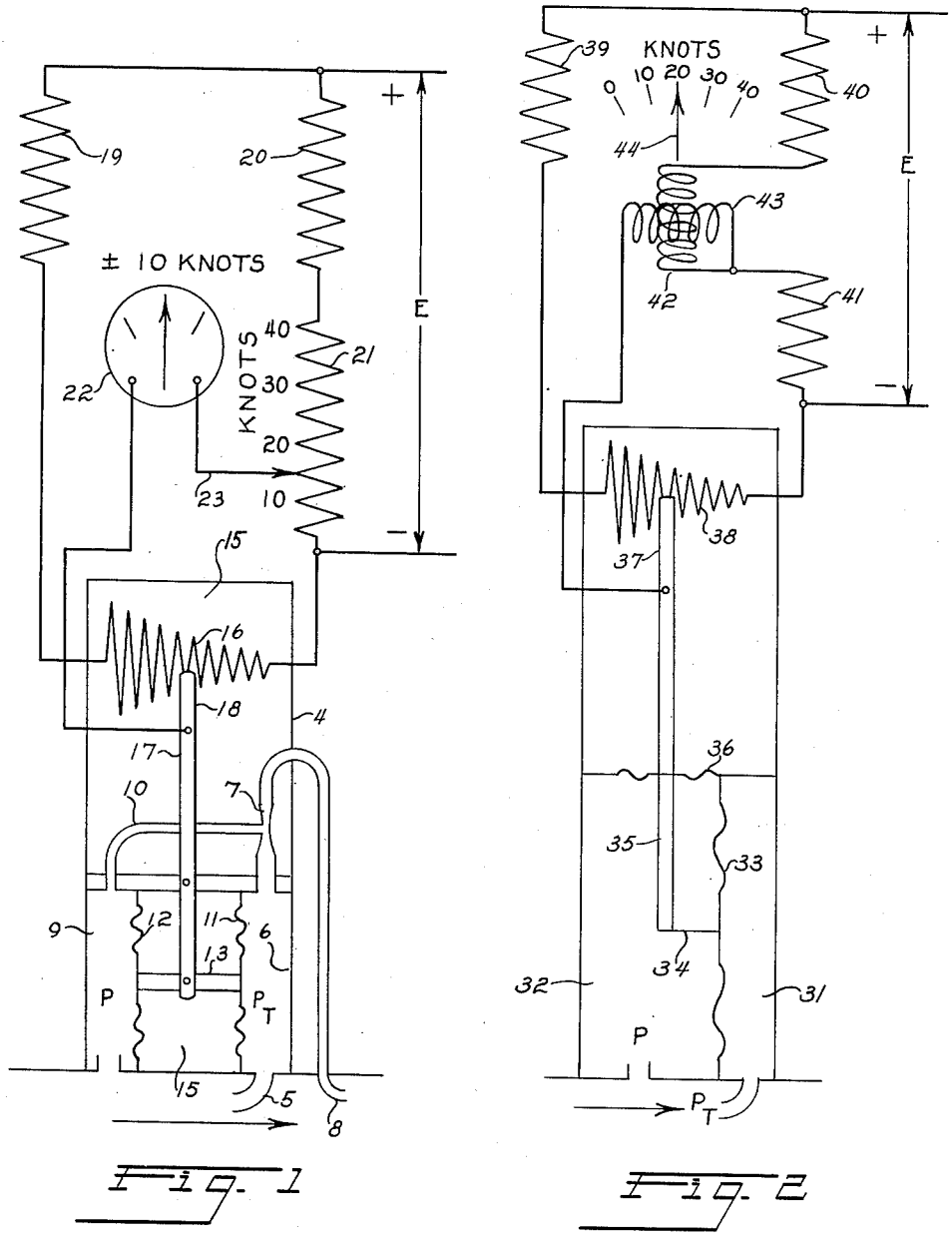
Figure 1 is a schematic drawing and diagram of connections of a speed indicator showing automatic means for eliminating air from the transmitter compartments.
Figure 2 shows a speed indicator utilizing a null type ratio indicator.

One form of the invention, a speed indicator is shown in Figure 1. The transmitter mechanism 4 is mounted in the bottom of the ship so as to minimize the possibility of a differential pressure caused by water in one tube and air in the other. This possibility is further avoided by the automatic priming means shown. The pressure developed in Pitot tube 5 will cause water to circulate through Pitot-pressure chamber 6, Venturi tube 7 and out reverse tube 8. The discharge tube in the section 7—8 is small as compared to the size of Pitot tube 5 so that the rate of flow through the Pitot tube is low and the pressure drop therein is negligible. This arrangement will cause any air which might get into compartment 6 to pass out through the discharge tube.

Also the suction created by water passing through Venturi tube 7 will take the air out of static pressure compartment 9 through tube 10. Here again tube 10 is small enough so that the rate of flow does not affect the pressure in compartment 9.

The construction shown wherein flexible diaphragms 11 and 12 are connected by rod 13 permits sealing of compartment 15 which contains the potentiometer 16, with an inert gas to prevent corrosion of electrical contacts.

The deflection of diaphragms 11 and 12 causes lever 17 to move the contactor 18 on potentiometer 16. Diaphragms 11 and 12 are relatively stiff diaphragms of good elastic material such as beryllium copper. Diaphragms which are stiff enough to stand the working pressure, without assistance, have been found to give better performance, elastically, than more flexible diaphragms which require the addition of auxiliary forces to balance the working pressure. Potentiometer 16 is connected in a bridge circuit with two fixed resistors 19 and 20 and a tapped resistor 21. A D'Arsonval galvanometer 22 is connected between the contactor 18 on potentiometer 16 and the tap switch 23 on resistor 21.

Potentiometer 16 and potentiometer 21 are mutually shaped to meet two requirements, first the galvanometer 22 shall stand on zero for the speeds corresponding to the tap setting on potentiometer 21 and second that the deflection of galvanometer 22 per unit variation from the speed setting on potentiometer 21 will be the same for each tap setting. This last requirement also involves a constant voltage supply E. It is pointed out, however, that voltage variations only affect the deflection part of the indication which is usually a small part of the total indication. The speed indication is equal to the sum of the tap setting plus the galvanometer indication.

Another speed indicator is shown in Figure 2. Compartment 31 is subjected to Pitot pressure and compartment 32 is subjected to static pressure. Compartments 31 and 32 are on opposite sides of flexible diaphragm 33. Movement of the diaphragm is transmitted through flexure strip 34 to lever 35 mounted through diaphragm seal 36 to the contactor 37 on potentiometer 38. Potentiometer 38 is connected with fixed resistances 39, 40 and 41 to form a bridge. Coils 42 and 43 are respectively the voltage and deflection coils of a ratio type speed indicator. The voltage coil 42 tends to hold the pointer 44 on zero while the deflection coil 43 tends to pull the pointer off zero. The deflection is proportional to the ratio of $i_{43}$ to $i_{42}$. Any change in supply voltage E affects the current in both coils proportionately, and deflections are practically independent of variations in the supply voltage from 50 to 150% of normal.

Since the indication of the ratio type speed indicator is an unique function of the position of the contactor on potentiometer 38, this potentiometer can be shaped so as to make the indicator scale uniform or the scale may be made non-uniform to accommodate a potentiometer of any shape.

Figure 3:
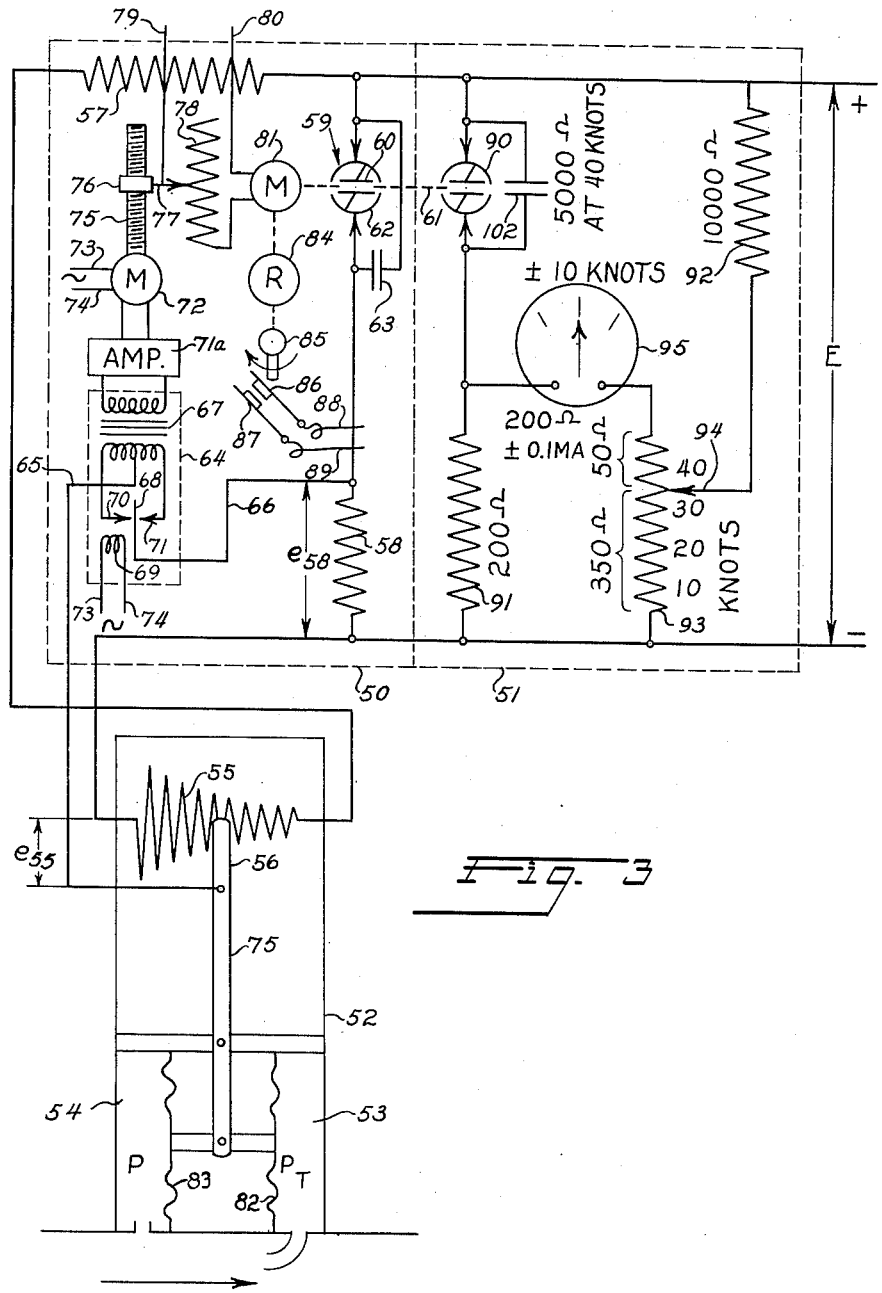
Figure 3 shows a combination speed integrator and speed indicator.

Figure 3 is a schematic diagram of a combination speed integrator 50 and speed indicator 51. If desired, the speed indicator 51 may be omitted leaving the integrator 50 in service.

Transmitter 52 is fundamentally the same as the transmitters of Figure 1 and 2, and includes Pitot and static pressure chambers 53 and 54 and a potentiometer 55 having a moving contactor 56 actuated by the differential pressure between 53 and 54. The bridge of the integrator 50 is composed of potentiometer 55, fixed resistances 57 and 58 and reversing condenser 59.

The reversing condenser 59 in its simplest form is a condenser 60 which is actually mounted in or on a rotating shaft 61 and rotates with the shaft. The terminals of the condenser are connected to the segments of a two segment commutator 62. Reversing condenser 59 in parallel with a by-pass condenser 63 is equivalent to a resistance of value, $$R = \frac{10^6}{CN} \quad (3)$$

where $C$ = the capacity of the reversing condenser in microfarads and $N$ = the number of discharges of the reversing condenser per second. For the two segment commutator 62 there are two discharges per revolution.

The theory of the reversing condenser is based on the assumption that the charges and discharges for each cycle are practically completed and thus the quantity of electricity transferred for each discharge has a constant value for all speeds. The average current is then proportional to the number of discharges per second and also to the R. P. M. of the shaft driving the reversing condenser. A full discussion of "condenser tachometers" is given in the applicants' co-pending application Serial No. 747,577, filed May 12, 1947, and now abandoned. The quantity varies directly with the applied voltage. This complete discharge is not difficult of realization. Instruments have been operated at a discharge frequency of 300 per second with no detectable deviation in the equivalent resistance from Equation 3. When resistances simulating brush contact resistances were added, it was necessary to add 1,000 ohms before any appreciable deviation from Equation 3 was noticed. The capacity of the reversing condenser was 0.5 microfarad. Theoretically the discharges with the 1,000 ohm series resistance, were 99.5% complete.

By-pass condenser 63 has no effect on the equivalent resistance but its use is necessary. Without the by-pass condenser the reversing condenser is not equivalent to a resistance because the charging voltage of the condenser is not that associated with the condenser arm of the bridge and the current fluctuations will affect the other arms of the bridge. The insulation of the by-pass condenser should be good and its capacity should be large enough to smooth the current fluctuations effectively.

The most useful application of reversing condenser is in resistance bridge circuits, the reversing condenser together with its by-pass condenser forming one arm of the bridge. Reversing condenser 59 is automatically operated at the speed which will balance the resistance bridge of which it is a part. The circuits are such that when the balance is accomplished, the speed of the reversing condenser is directly proportional to the water speed and the total number of revolutions is a measure of the distance traveled.

The bridge is automatically and continuously balanced by action of voltage detector or "chopper" 64. The function of the chopper is to change a small D. C. voltage to an interrupted D. C. or alternating voltage so that it can be amplified by an electronic amplifier. A source of alternating current is required, to operate the chopper. Referring to Figure 3, the chopper 64 operates to bring the voltage between lines 65 and 66 to zero. Line 65 is connected to the center tap of the primary of transformer 67 and line 66 is connected to vibrator 68 which is vibrated by A. C. electromagnet 69 to make contact alternately with two contacts 70 and 71 which are connected to the primary of transformer 67. If any potential difference exists between lines 65 and 66 an alternating voltage will be reveloped in the secondary of transformer 67. This is amplified by the amplifier 71a and fed into one phase of two-phase motor 72. The other phase of this motor is constantly excited from the same A. C. source 73, 74 which supplies electromagnet 69. This makes motor 72 reversible, the direction of rotation depending on the relative polarity of lines 65 and 66. Motor 72 drives a worm shaft 75 having a nut 76 carrying a contactor 77 on rheostat 78 which is connected in the lines from a D. C. power source 79, 80 to control the speed of direct current motor 81 and thus to adjust the effective resistance of reversing condenser 59 to balance the bridge.

The ratio $e_{58}/E$ does not vary directly as the speed of the reversing condenser 59 because as the speed increases the voltage across the reversing condenser decreases. But, the speed N is an unique function of $e_{58}/E$. Also $e_{55}/E$ is an unique function of the speed of the ship, and since $e_{58}=e_{55}$, the speed N is an unique function of the speed of the ship and potentiometer 55 can be shaped so as to make N directly proportional to the speed of the ship. The shape of the winding of potentiometer 55 will be slightly different from the square root relationship indicated by Equation 2 so as to take care of (1) any lack of linearity in the deflection of diaphragms 82 and 83 and (2) the lack of linearity introduced by resistance 58 in series with reversing condenser 59.

Motor 81 drives reduction gear 84 and cam 85, which closes contacts 86 and 87, at a frequency which is proportional to the water speed. These contacts supply electrical impulses at a specified number per mile traveled, for the operation of the latitude and longitude indicator or a graphical tracking machine. Wires 88 and 89 lead to this equipment, which is not shown.

The speed indicator 51 is a bridge circuit consisting of reversing condenser 90, fixed resistances 91 and 92 and tapped resistance 93. Reversing condenser 90 is mounted on the same shaft 61, and driven at the same speed as reversing condenser 59 of the speed integrator. The conductance of the reversing condenser arm of the bridge is therefore directly proportional to the speed of the ship.

Resistor 93 has taps as shown for a contactor 94 for speeds from 5 to 40 knots in 5 knot increments. Deflection galvanometer 95 is connected so that each increment of resistance as it is removed from adjustable bridge arm 93, is added to the galvanometer circuit. This is just the amount of added resistance required in the galvanometer circuit to maintain its deflection per unit speed variation the same for each speed setting on resistance 93.

All of the instruments described in this specification have delicate potentiometers. Such arrangements have given trouble in the past but there is one improvement, hermetic sealing in an inert gas, which gives much better performance. The pressure operated potentiometers of all of the instruments described in this specification are adaptable to hermetic sealing as shown in the drawings.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as new and desire to secure by United States Letters Patent is:

1. In a speed integrator, a Wheatstone bridge circuit having a first arm including a reversing condenser and a fixed condenser in parallel, second and third arms each including a fixed resistance, and the fourth arm comprising a potentiometer, variable speed means operable in response to bridge unbalance for driving said reversing condenser, a fluid speed responsive device operable to adjust the position of the contactor on said potentiometer to unbalance the bridge and thereby to control said variable speed drive means for said reversing condenser to balance the bridge circuit when the bridge circuit becomes unbalanced by said fluid speed responsive device, and said variable speed drive means for said reversing condenser being adapted to be connected to a distance measuring device.

2. A speed indicator comprising a Wheatstone bridge circuit having in a first arm a variable resistance graduated in speed units, second and third arms each including a fixed resistance, and the fourth arm, opposite the first arm, including a reversing condenser and a fixed condenser in parallel therewith, means operable to reverse said reversing condenser at a rate proportional to the speed to be measured, and a deflection galvanometer graduated in speed units and having one connection to the juncture of the first and third arms of said bridge circuit and a second connection to the juncture of the second and fourth arms of said bridge circuit, wherein one end of said variable resistance is connected to said galvanometer and the other end to a voltage supply, and a contactor of said variable resistance is connected to one of said fixed resistances, whereby said variable resistance is so connected that as each increment is removed from the bridge arm it is introduced into the galvanometer circuit.

JOHN B. PETERSON.

References Cited in the file of this patent

UNITED STATES PATENTS

| Number | Name | Date |
| --- | --- | --- |
| Re. 22,572 | Miller | Nov. 28, 1944 |
| 1,665,857 | Needham | Apr. 10, 1928 |
| 1,968,539 | Rydberg | July 31, 1934 |
| 2,018,431 | Wolf | Oct. 22, 1935 |

FOREIGN PATENTS

| Number | Country | Date |
| --- | --- | --- |
| 317,397 | Great Britain | Nov. 30, 1930 |